2 Sheets—Sheet 1.

F. MOORE.
Solar-Compass.

No. 224,102. Patented Feb. 3, 1880.

WITNESSES
INVENTOR
ATTORNEY

F. MOORE.
Solar-Compass.

No. 224,102.        Patented Feb. 3, 1880.

WITNESSES
H. Aubrey Toulmin.
J. B. Toulmin.

INVENTOR
Frank Moore.
Morton Toulmin
ATTORNEY

UNITED STATES PATENT OFFICE.

FRANK MOORE, OF MINDEN, LOUISIANA.

SOLAR COMPASS.

SPECIFICATION forming part of Letters Patent No. 224,102, dated February 3, 1880.

Application filed July 19, 1879.

*To all whom it may concern:*

Be it known that I, FRANK MOORE, of Minden, in the parish of Webster and State of Louisiana, have invented a new and useful Improvement in Solar Compasses, of which the following is a specification.

The object of my invention is to provide an instrument by which the true north and south can be ascertained in any part of the globe, whether on land or at sea, without the aid of the magnetic needle, either at 9 o'clock a. m., 12 o'clock m., or 3 o'clock p. m.

The invention consists in the combination of two vertical standards, one of which is stationary, attached to a plate of metal, (or other suitable material,) which forms a horizontal plane to receive shadows and reflections which are cast from the vertical standards, and of arms pivoted to the vertical standards, so arranged and graduated that they may be adjusted in such a manner as to accomplish the object above named.

Figure 1:
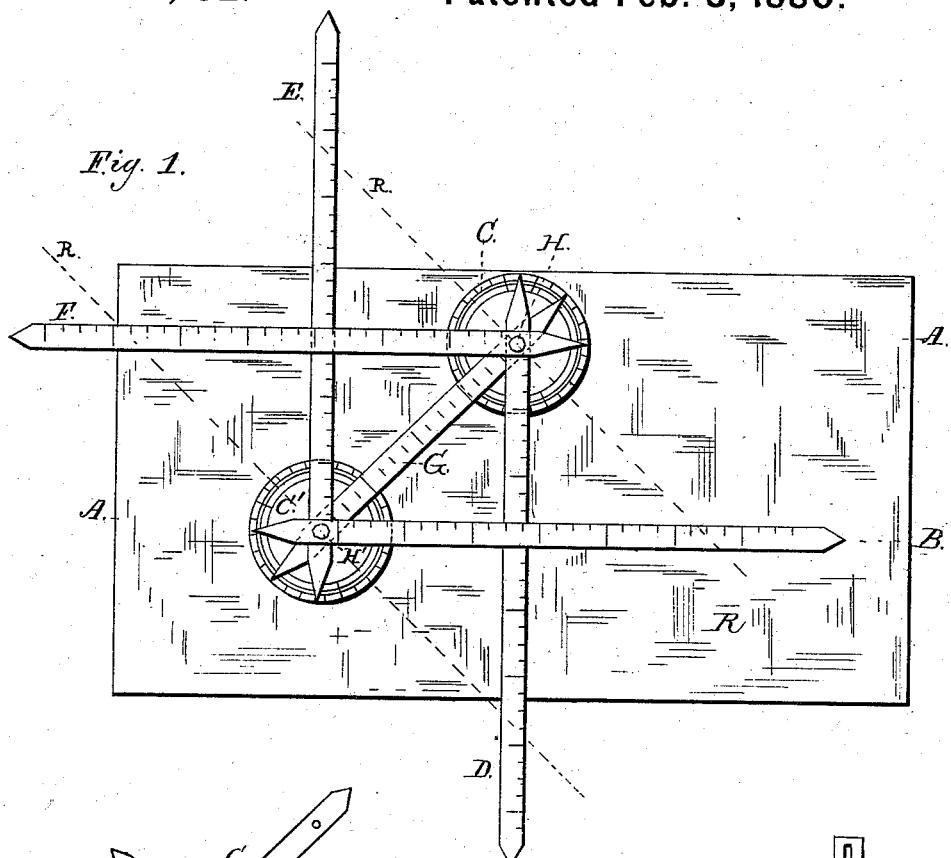
Figure 4:
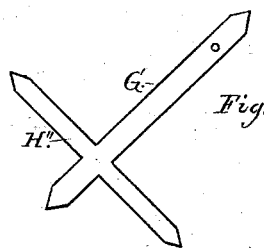
Figure 3:
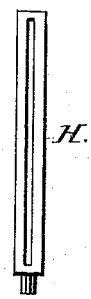
Figure 2:
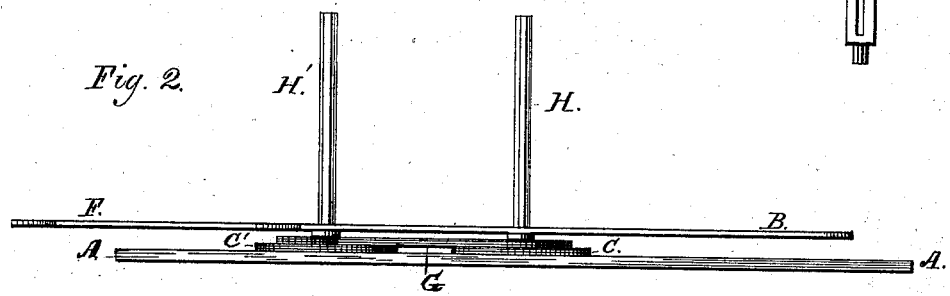
Figure 5:
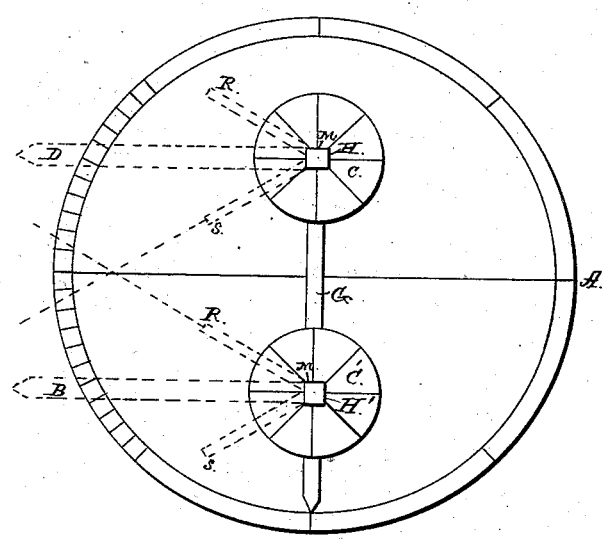
Figure 6:
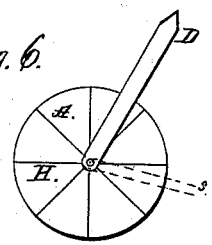

Figure 1 is a plan view of the instrument, and Fig. 2 is a side elevation.

H is a permanent standard, having an octagonal cross-section, and should be fastened perpendicularly to the plate A. It passes through the circular graduated plate C and arms D F G, which arms swing around upon it as a pivot. The shorter arm, G, is attached to a circular graduated plate, C', to which is fastened another standard, H', having an octagonal cross-section, and being of equal height to permanent standard H. The standard H' forms a pivot for the arms B E, and these two standards H and H' have their sides highly polished to answer the purpose of mirrors, in order that they may cast sun-reflections upon the plate A, which plate must always be in a true horizontal position when operating the instrument.

The arms B D E F G are each pointed at each end, and are graduated into equal numbers of parts to facilitate the adjustment of the instrument and enable the operator to form squares and rectangles with the arms B D E F, the arm G being always a diagonal to any of these figures, and is the shadow-arm. It turns upon H as a pivot, and has attached to its opposite end the graduated circular plate C and the standard H', upon which the arms B and E are pivoted. The graduations on the arms B E enable them to be set parallel to each other and perpendicular to E D without recourse to other means of measurement. The standards H H' should be made of equal height, so as to cast shadows and reflections of equal length.

In Fig. 1 the instrument is represented with the standard H turned to the south. The sun being in the west, the shadow from the standard H will fall on a line with the diagonal G, and the reflections from the octagonal sides of the standards H and H' will then be at right angles thereto, as shown by the dotted lines R R. The arm D will then point north and the arm E south, this being at 3 o'clock in the afternoon. The circular plate C' is to steady the standard H', and is graduated to facilitate the adjustment of the arms E and B.

The operation of the device is as follows: The instrument is placed approximately north and south, (the standard H being on the south side of the instrument.) The arm D will then point approximately toward the north. The diagonal G is then turned so that the shadow from the standard H will cross the reflections R. (Shown in Fig. 1 by dotted lines.) The arms D and F, being then brought into the line of reflections R, are swung round to make the angle F H D equal to ninety degrees, or a right angle, and located in such position as that the angles R' H D E H F are equal from these two sides. The remainder of the rectangle may be completed by swinging the arms F and B round at right angles to the sides D and F. The sides D and E will then be found to point, respectively, to the north and south, and the sides B and F to the east and west, at the following hours of the day, viz: at 9 o'clock a. m., or the end of the first quarter; at 12 o'clock m., or noon, and at 3 o'clock p. m., or end of the third quarter.

Figs. 3, 4, 5, and 6 represent different modifications which I have tried and have used to work out my invention; but I prefer to construct the instrument as shown in Figs. 1 and 2, and to retain standard H' and circular graduated plate C', as they add to the accuracy of nice adjustment.

I claim—

1. In a solar compass, the vertical octagonal standard H, in combination with plate A, substantially as shown and described, and for the purposes set forth.

2. The combination of the plate A, circular plates C and C', with vertical standards H H', and diagonal arm G, substantially as shown and described, and for the purposes set forth.

3. The combination of the graduated plate A, graduated plates C C', standards H H', graduated arms B E F D, and diagonal arm G, substantially as described, and for the purposes set forth.

FRANK MOORE.

Witnesses:
J. L. TILLY,
R. H. S. THOMPSON.